United States Patent
Van Heyningen

[11] Patent Number: 6,058,760
[45] Date of Patent: May 9, 2000

[54] APPARATUS AND METHOD FOR SENSING ANGULAR DISPLACEMENT

[75] Inventor: Arent Kits Van Heyningen, Newport, R.I.

[73] Assignee: KVH Industries, Inc., Middletown, R.I.

[21] Appl. No.: 09/135,769

[22] Filed: Aug. 18, 1998

[51] Int. Cl.$^7$ .................................................. G01B 21/00
[52] U.S. Cl. .............................. 73/1.79; 33/1 N; 74/471
[58] Field of Search ............................ 73/430, 526, 1.79, 73/432.1, 490; 33/1 N, 1 PT, 343, 344, 345, 346, 392, 402, 732, 366.14, 391; 74/471, 471 R, 479.01

[56] References Cited

U.S. PATENT DOCUMENTS

| | | | |
|---|---|---|---|
| 3,241,245 | 3/1966 | Levine | 33/215 |
| 3,552,028 | 1/1971 | Simon | 33/206 |
| 3,651,691 | 3/1972 | Pliha | 73/178 |
| 4,277,895 | 7/1981 | Wiklund | 33/366 |
| 4,564,909 | 1/1986 | Kramer | 33/363 K |
| 4,584,577 | 4/1986 | Temple | 33/1 N |
| 4,592,147 | 6/1986 | Herman | 33/366 |
| 4,653,190 | 3/1987 | Spain, Jr. | 33/125 |
| 4,788,645 | 11/1988 | Zavoli et al. | 364/449 |
| 4,811,613 | 3/1989 | Phillips et al. | 74/5.6 |
| 4,829,247 | 5/1989 | Wallrafen | 324/208 |
| 5,174,035 | 12/1992 | Yamazaki | 33/395 |
| 5,247,748 | 9/1993 | Hojo et al. | 33/326 |
| 5,452,519 | 9/1995 | Crocker et al. | 33/366 |
| 5,455,508 | 10/1995 | Takahashi | 324/207.2 |
| 5,525,901 | 6/1996 | Clymer et al. | 324/207.2 |
| 5,670,877 | 9/1997 | Scheiber | 324/207.2 |
| 5,671,043 | 9/1997 | Ivers | 356/138 |

*Primary Examiner*—Hezron Williams
*Assistant Examiner*—Helen C. Kwok
*Attorney, Agent, or Firm*—Wolf, Greenfield & Sacks, P.C.

[57] ABSTRACT

An apparatus and method for sensing angular displacement of a rotating object. A reference object is provided that maintains an independent angular reference. An angular displacement of the rotating object may be measured with respect to the reference object. The apparatus may include a turn sensor for measuring directional changes in the heading of the object, an angular compensator, and a servomotor for maintaining the turn sensor in a same angular position. The object may be a vehicle such as a boat, car, train, airplane or any other vehicle. The turn sensor is coupled to the servomotor that may be attached to a platform of the vehicle. As the vehicle rotates, the heading of the vehicle changes. The servomotor rotates the turn sensor housing to keep the sensor at the same angular position. The heading may be determined by measuring an angular difference between the position of the turn sensor in relation to the moving object.

21 Claims, 14 Drawing Sheets

APPARATUS AND METHOD FOR SENSING ANGULAR DISPLACEMENT

FIELD OF THE INVENTION

This invention relates to a method and apparatus for sensing angular displacement and can be used, for example, for measuring directional changes of a moving object.

BACKGROUND OF THE INVENTION

Conventional apparatus exist for sensing the angular displacement, or turn of an object. These apparatus may detect changes in angular displacements of an object and provide outputs that may be used to determine such indications as location, heading, rotational speed, among others. These indications may be particularly useful when the object is a vehicle and where the operator needs to know the location and/or heading of the vehicle. A gyroscope is one such conventional apparatus used for sensing turn of an object.

A gyroscope typically includes a rotating object mounted within an enclosure, wherein the object rotates in a reference axis at a high rate of speed. The object is generally mounted on a complicated set of bearings so that when the enclosure moves, no net torque acts to change the objects' direction of angular momentum. However, these changes in angular momentum are sensed by the gyroscope. The rotating object generally must rotate at high speeds for certain mathematical assumptions to accurately describe the object's motion. When the gyroscope is mounted to an object, the gyroscope detects changes of angular momentum which may be used to determine changes in angular displacement. Angular momentum is proportional to angular velocity, and thus angular displacement may be determined from angular velocity generally through an integration calculation.

As discussed above, a gyroscopic apparatus may be used to detect changes in the angular rate of movement of an object. A typical gyroscopic apparatus used for this purpose generally includes a disk that rotates at high speed, e.g. from a few thousand rpm to upwards of 20,000 rpm. The disk may be flexible or include flexible members that extend from an axis of rotation of the gyroscope.

As the disk is rotated, any movement about an axis perpendicular to the axis of rotation of the disk will cause the flexible disk members to flex toward and away from a plurality of plate members, changing a capacitance between the plate members and the flexible disc members. An electrical circuit is provided to generate a signal based on the changing capacitance. This signal is used to determine the movement of the object about a reference axis. The signals are generally interpreted by a system which provides indications or performs corrective actions relating to the angular movement of the object. For example, one such system may provide a heading indication onboard a vehicle, the heading indication being used for navigational purposes. One such angular rate gyroscope is disclosed in U.S. Pat. No. 4,811,613 issued Mar. 14, 1989 to Phillips et al.

Drawbacks of conventional gyroscopic sensors include a susceptibility to frequent failures of the moving parts, particularly the motor that rotates the disk at high speed. The mean time between failures (MTBF) of conventional gyroscopic sensors is directly related to the number of rotations of the motor. Because frequent failures occur, the gyroscopic sensors must be frequently serviced and calibrated. Conventional sensors are also sensitive to vibration and gravity. Further, these sensors generate electrical noise because of the frequency of motor rotation.

SUMMARY OF THE INVENTION

One embodiment of the invention is generally directed to a method for sensing and measuring angular displacement of a rotating object. A method is provided for measuring angular motion of the rotating object be providing a reference object for the rotating object such that the reference object maintains an independent angular position despite a rotational motion of the object. Further, the method includes measuring the rotational motion of the object by measuring an angular displacement of the object with respect to the angular position of the reference object.

In another aspect, an apparatus is provided for measuring a displacement angle of a rotating object. The apparatus includes a container having a fluid, a reference object that is allowed to rotate freely within the container and is positioned within the container, and a sensing element configured to sense an angular displacement of the rotating object with respect to the reference element.

In another aspect, an apparatus is provided for measuring a displacement angle of an object. The apparatus includes a reference coupled to the object so that the reference object independently maintains an angular position despite the rotational motion of the object and a reference device that is coupled to the object. The reference device includes an angular compensator having an output providing a control signal that controls rotation of the reference device with respect to the object so that the reference device maintains an angular relationship with the reference object and a position unit having an input that receives the control signal and an output that provides an indication of the rotational motion of the object based upon the control signal.

In another aspect, a method is provided for measuring a displacement angle of an object. The method includes steps of arranging a reference object so that the reference object is coupled to the object but does not move in the direction in response to the angular motion of the object, controlling a reference device to move in relation to the reference object so that the reference device substantially maintains an angular relationship with the reference object and measuring the angular motion of the object based upon an amount that the reference device is controlled in the step of controlling.

Advantageously, various embodiments do not require a motor that rotates at high frequencies because the sensor detects angular displacement directly in contrast to conventional gyroscopes that sense changes in angular momentum by precession. Further, various embodiments are less susceptible to vibrations or lateral accelerations than conventional sensors due to the damping effect of a liquid within the sensor. Also, because various embodiments include a motor that rotates at lower frequencies than those of conventional sensor devices, less radio frequency interference (RFI) noise is generated by the sensor. In addition, because there are fewer moving parts and the frequency of motor rotation is less than that of conventional sensors, motor life expectancy is greater for one embodiment than that of conventional devices. These and other advantages are provided by the following embodiments and methods.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a referenced numeral identifies the drawing in which the reference numeral first appears.

BRIEF DESCRIPTION OF THE DRAWINGS

The above and further advantages of this invention may be better understood by referring to the following detailed description when taken in conjunction with the accompanying drawings, in which.

DETAILED DESCRIPTION

Figure 1A:
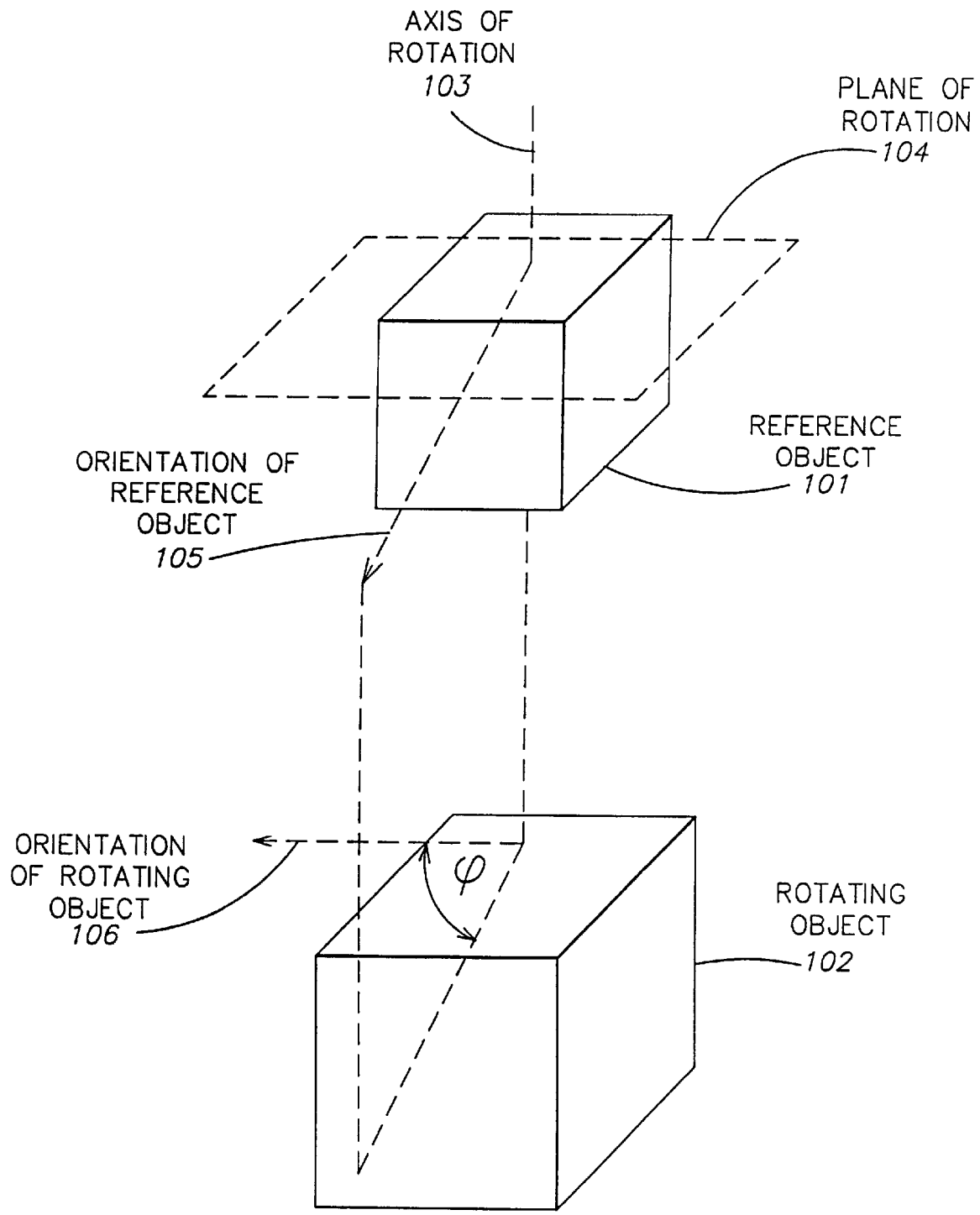
FIGS. 1A–1E are block diagrams of exemplary turn sensors in accordance with various embodiments of the invention.

FIG. 1A is a block diagram of an example apparatus in accordance with one embodiment of the present invention. A rotating object 102 is the object of which the angular motion in a plane of rotation 104 is sensed. A reference object 101 is provided which is used as an angular reference of which the angular position in the plane of rotation 104 remains constant. Reference object 101 may maintain an angular position that is independent from the rotational movement of object 102. Reference object 101 is also isolated from external forces to the object 101 such that object 101's rotation in the plane of rotation 104 is not affected by the external forces. The angular displacement of object 102 can be determined by measuring the angular displacement if the rotating object 102 with respect to the reference object 101. One such method may include determining an angular difference φ between an orientation 105 of reference object 101 and an orientation 106 of rotating object 102. The displacement angle φ represents the angular displacement of object 102 in the plane of rotation 104. It should be understood that additional reference objects oriented in an orthogonal planes of rotation may be used to determine rotation in three dimensional space.

Advantageously, angular displacement is measured directly unlike in conventional gyroscopic sensors that require reference elements that rotate at high frequency to maintain their gyroscopic effect. Gyroscopic sensors are used to sense angular momentum, which is then used to calculate angular displacement. However, this calculation involves integration that is sensitive to component error and drift. Further, conventional sensors are affected by external forces, such as external magnetic fields or gravitational forces. In one aspect, a reference object 101 may be substantially isolated from forces external to object 101.

The rotating object 102 may be, for example, a vehicle such as a boat, car, train, airplane, or any other vehicle. Reference object 101 may be coupled to the object 102 such that the reference object 101 remains isolated from rotational effects of object 102. As the object 102 rotates, that is, the heading of the object changes, the heading may be determined from a measured angular difference between the position of the sensor in relation to the object 102.

In one embodiment, a sensor, angular compensator, and a servomotor are provided for maintaining the sensor in a same angular position in a plane of rotation of the sensor. The servomotor rotates the sensor housing to keep the sensor at the same angular position. The heading is determined as the angular difference between the position of the turn sensor in relation to the object. The present invention overcomes disadvantages of the prior art by providing a sensor that includes elements that rotate at lower frequencies than that of conventional sensors.

Figure 1B:
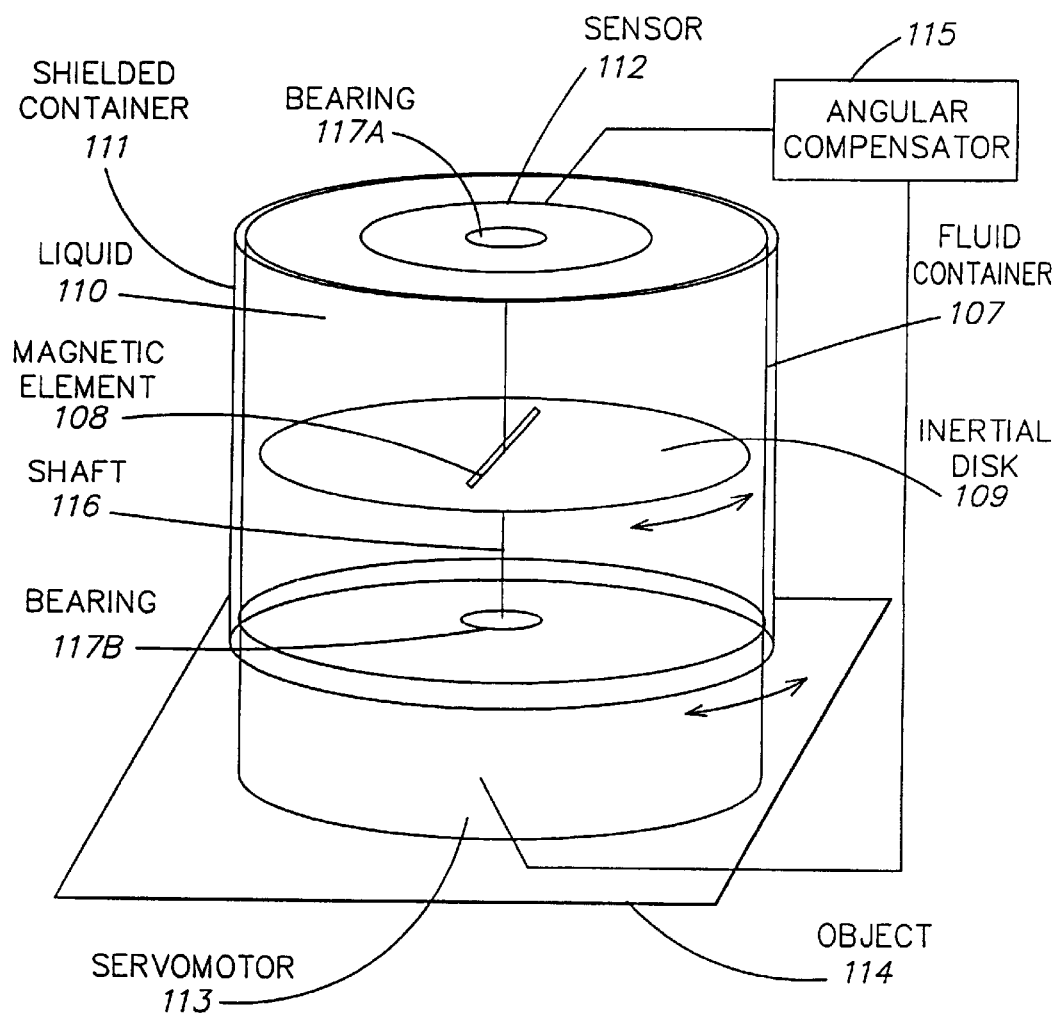

FIG. 1B is block diagram of an example sensor. An inertial disc 109 serves as a reference object at whose position in a rotational plane remains constant. The inertial disc 109 is suspended in a liquid 110 within a fluid container 107 and is neutrally buoyant in the liquid 110 filling the container 107. The liquid serves to isolate inertial disc 109 from vibrational as well as gravitational forces. Container 107 may include an expansion reservoir or other equivalent structure to allow for the expansion and contraction of container 107 and liquid 110. It is understood that other object shapes may be used as the reference object, such as spheres, bars, or the like. Also, other containment methods may be used to isolate the reference object from external forces. The disc 109 is fastened to a shaft 116 positioned through the center of the disc 109. The shaft 116 is constrained from lateral movement, the ends being held within bearings 117 fastened to the container 107. Other methods for constraining or suspending the reference object may be used, such as constraining the reference object with magnetism. The angular position of the disc 109 is measured by a sensor 112 mounted on the container 107 and a magnetic element 108 mounted on disc 109. The container 107 is connected to a servomotor 113, the latter being mounted to the object 114 whose rotation is being measured. The sensor may be mounted on a platform of the object 114. The platform, for example, may be a fixed structure of the object that tracks the rotational movement of the object. The servomotor 113 rotates the container 107 in a clockwise or counter-clockwise direction. To eliminate effects of extraneous magnetic fields, the container 107 may be placed within a shielded container 111. Thus, the magnetic element 108 is substantially isolated from external magnetic fields that may effect the movement of disc 109. Alternatively, magnetic shielding may be applied in other areas of the sensor, or may be external to the sensor as needed to attenuate external magnetic fields. Therefore, disc 109 and its magnetic element are substantially isolated from external forces such as magnetism, gravity and friction that may affect their movement. It is understood that other methods of isolating components from external forces may be used.

The servomotor 113 is controlled by an angular compensator 115 that provides a corrective signal to the servomotor 113 to maintain the sensor 112 at a same angular position in relation to the inertial disc 109. Thus, the servomotor 113 rotates the container 107 to align it with inertial disc 109 because the sensor 112 is mounted to container 107. It should be understood that other methods for maintaining an object at a same angular position in relation to another object may be used.

During the operation of the apparatus in FIG. 1B, a disc angle is measured when the system is at rest and the measured angle is used as a reference angle ($\phi_{ref}$). When the platform is turned clockwise or counter clockwise, the disc 109, which is free floating, will remain stationary in the plane of rotation of the object and the sensor 112 measures an angular change relative to the container 107. An angular compensator 115 forces the servomotor 113 to turn the container 107 back towards its original position in relation to the disc 109. This servomotor 113 is configured as a null-seeking servomotor that forces the container to remain aligned with disc 109. Null-seeking servomotors are well-known in the art of control systems. If the platform turns, the container 107 turns in the opposite direction as controlled by the angular compensator 115. Preferably, the disc 109 has mass, and therefore inertia, but places substantially no weight on the supporting bearings 117 because it is suspended by the liquid 110. Substantially no friction will develop in the bearings 117 because the weight of the disc is relieved by the suspending liquid. In one embodiment, the liquid 110 is homogeneous, has low viscosity and large inertia. Generally, there is viscous friction between walls of the container 107 and the liquid 110. However, frictional forces between the inner wall of the container and the liquid may only develop if the container 107 turns relative to the liquid 110. Because the angular compensator 115 keeps the container 107 aligned with the disc 109, these frictional forces may not develop. It should be understood that other methods for reducing friction may be employed.

The amount of turn of the object 114 in the plane of the disc 109 is identical to the amount of turn in the opposite direction of the container 107. The container 107 is rotated proportionally to the rotation of the servomotor 113 that is coupled to the container.

Generally, any number of sensors may be used to determine any parameter related to angular displacement. To sense turn in a single plane, one turn sensor may be used. In another embodiment of the invention, if three sensors are used in an orthogonal configuration, an inertial platform is created that may measure movement in three dimensional space.

Figure 1C:
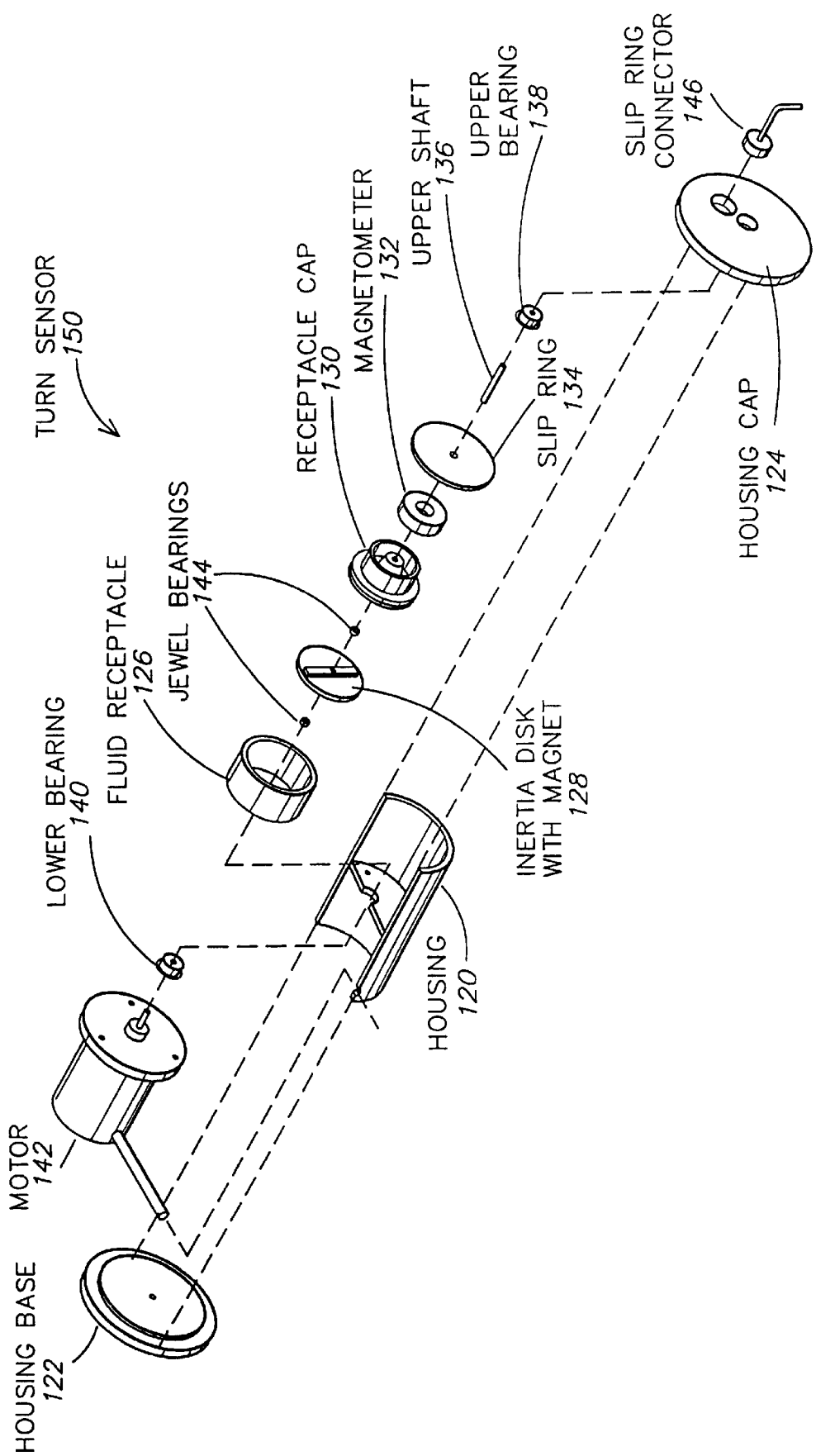
Figure 1D:
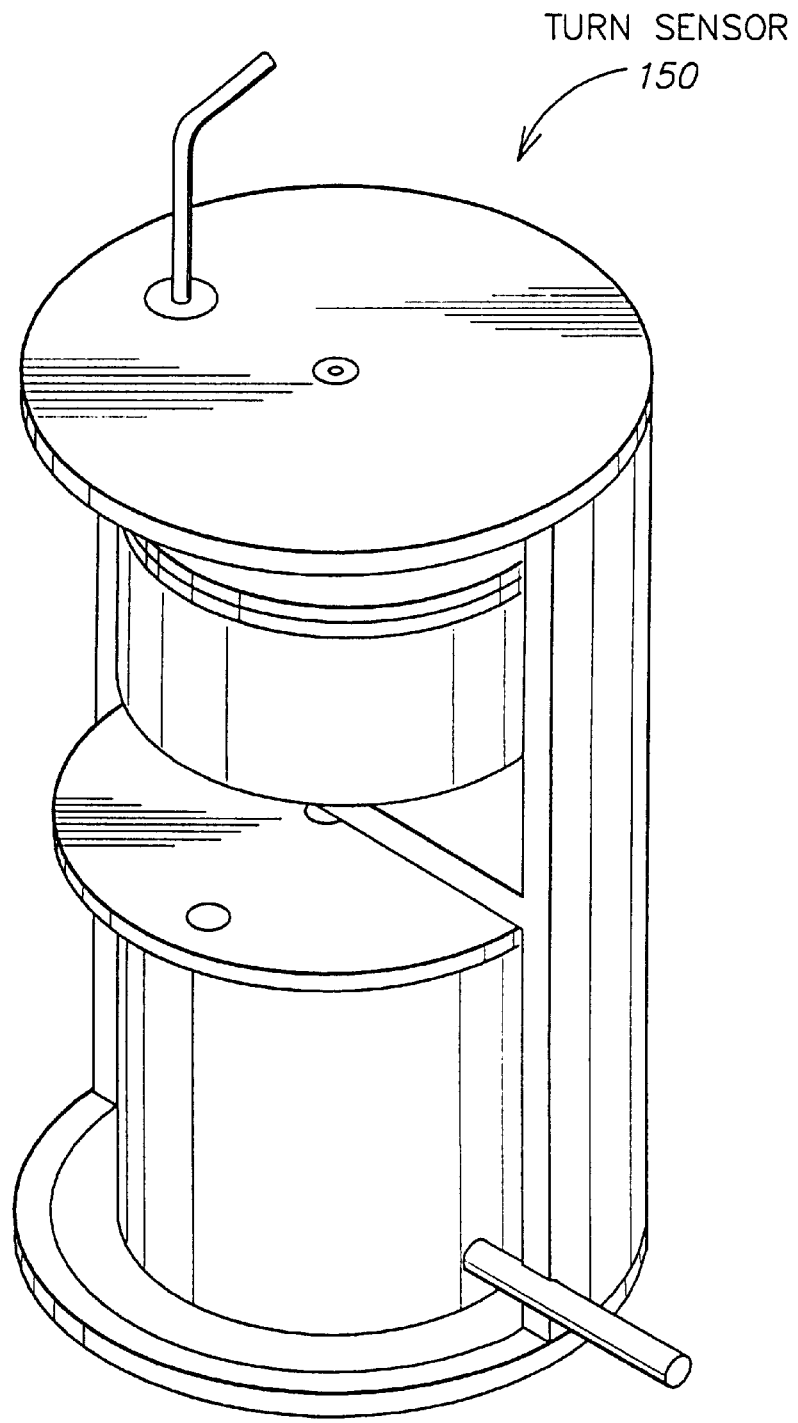
Figure 1E:
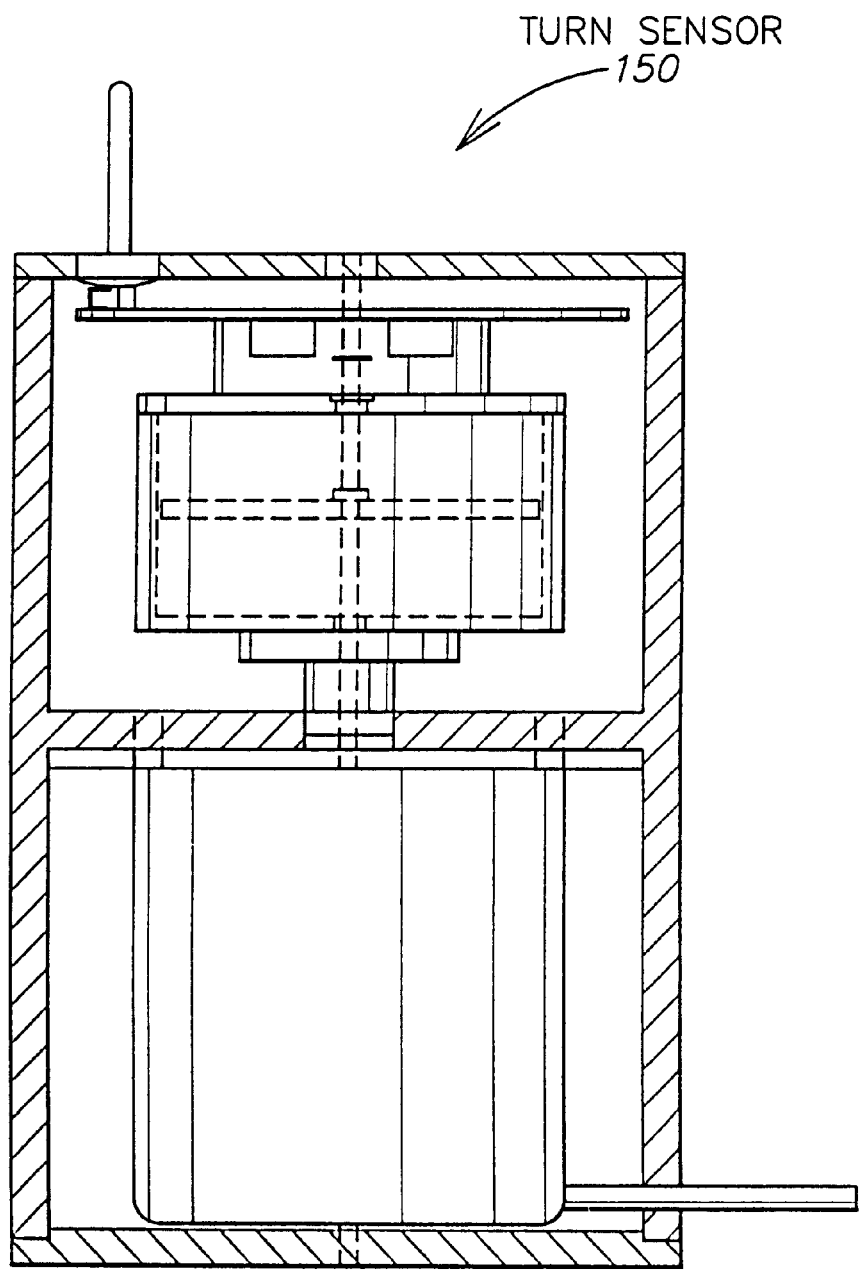

FIGS. 1C–E show a construction of another example of a sensor. As shown in FIG. 1B, turn sensor 150 includes a housing 120, a housing base 122, and a housing cap 124 which encloses the sensor components. This housing also functions as a magnetic shield which attenuates external magnetic fields so as to insure proper sensor operation. The container housing 120–124 may be manufactured of a magnetic shielding material such as $\mu$-metal. Other shielding materials may be used. Sensor 150 may include both a lower 140 and upper 138 bearing that accepts a shaft 136. Sensor 150 may also include jewel bearings 144 or any other mounting method that may be used to constrain the shaft 136 from lateral movement and to reduce friction between the shaft 136 and inertial disc 128. Inertial disc 128 may include a magnet that generates a magnetic field within the sensor housing 120–124. This field is sensed by a magnetometer 132. It should be understood that any method for sensing the movement of a reference may be used. The magnetometer is affixed to the receptacle cap 130 and senses magnetic flux produced by the rotating magnet attached to the rotating disc 128. Other methods of measuring magnetic flux may be used. Slip ring 134 is used to transfer the signals produced by the magnetometer 132 to an external angular compensator 109 without requiring cable connections to the turn sensor that would otherwise impede sensor movement. Other methods for transferring the signals may be used. The connection to an external angular compensator 109 is provided by the slip ring connector 146. FIGS. 1D–E show various aspect views of exemplary turn sensor 150.

Inertial disc 128 may be made, for example, of a lightweight plastic. The disc may be manufactured of any lightweight material such that friction is reduced in bearings 138, 140, 144. Shaft 136 may be made from stainless steel or any other material that is strong and rigid yet lightweight. Jewel bearings 144 can be used as these bearings are non-corrosive and not affected by magnetism. Fluid receptacle 126, which houses the liquid, could be coated by a non-corrosive coating such as LEXAN (LEXAN is a registered Trademark of the General Electric Company) or other polycarbonate resin. Other non-corrosive materials may be used. The liquid (not shown) may be, for example, an inert liquid such as the fluorinated hydrocarbon FLOURINERT which has a high specific density relative to the plastic disc (Flourinert is a registered trademark of the 3M Corporation). Other materials may be used, such as inorganic oil.

The liquid, which preferably has a high specific density, is chosen with respect to the inertial disc so that the inertial disc will be weightless when positioned within the fluid. In one embodiment of the invention, the specific density of the liquid is controlled by mixing different varieties of the liquid having different specific densities. The liquid provides additional functionality by isolating internal sensor components to vibration and shock. Thus, the inertial disc 128 is suspended in a friction free, weightless environment.

Magnetometer 132 may be, for example, a toroidal sensor having wire wound around a core made of high $\mu$-metal. Any device which senses changes in the magnetic field may be used. Magnetometer 132 detects changes in magnetic flux of the rotating disc 128 which induces a change in current in coils of the magnetometer 132. The magnet that is mounted to the inertial disc 128 may be, for example, made of a magnetic material that provides a biaxial field such as a two pole magnet. This magnet should be a steel sewing needle that is magnetized and is lightweight so as to not create friction in the bearings. For example, the magnet could be the same as those used in the construction of conventional magnetic compasses. Other magnets that create a biaxial field and are lightweight may used. The magnet should be capable of generating a field which may overcome any external magnetic field leaking through the sensor housing 120–124.

In an alternative embodiment, the sensor may be enclosed in a Helmholtz cage having three dimensional magnetometers. Using a servoloop, the cage may create a nullifying magnetic field external to the sensor to effectively cancel the extraneous magnetic fields in the area surrounding the sensor housing. The magnetic field produced by the sensor may be measured more efficiently, especially if the sensor's magnetic field is relatively weak as compared to the extraneous fields. Other shielding solutions may be used.

Figure 2:
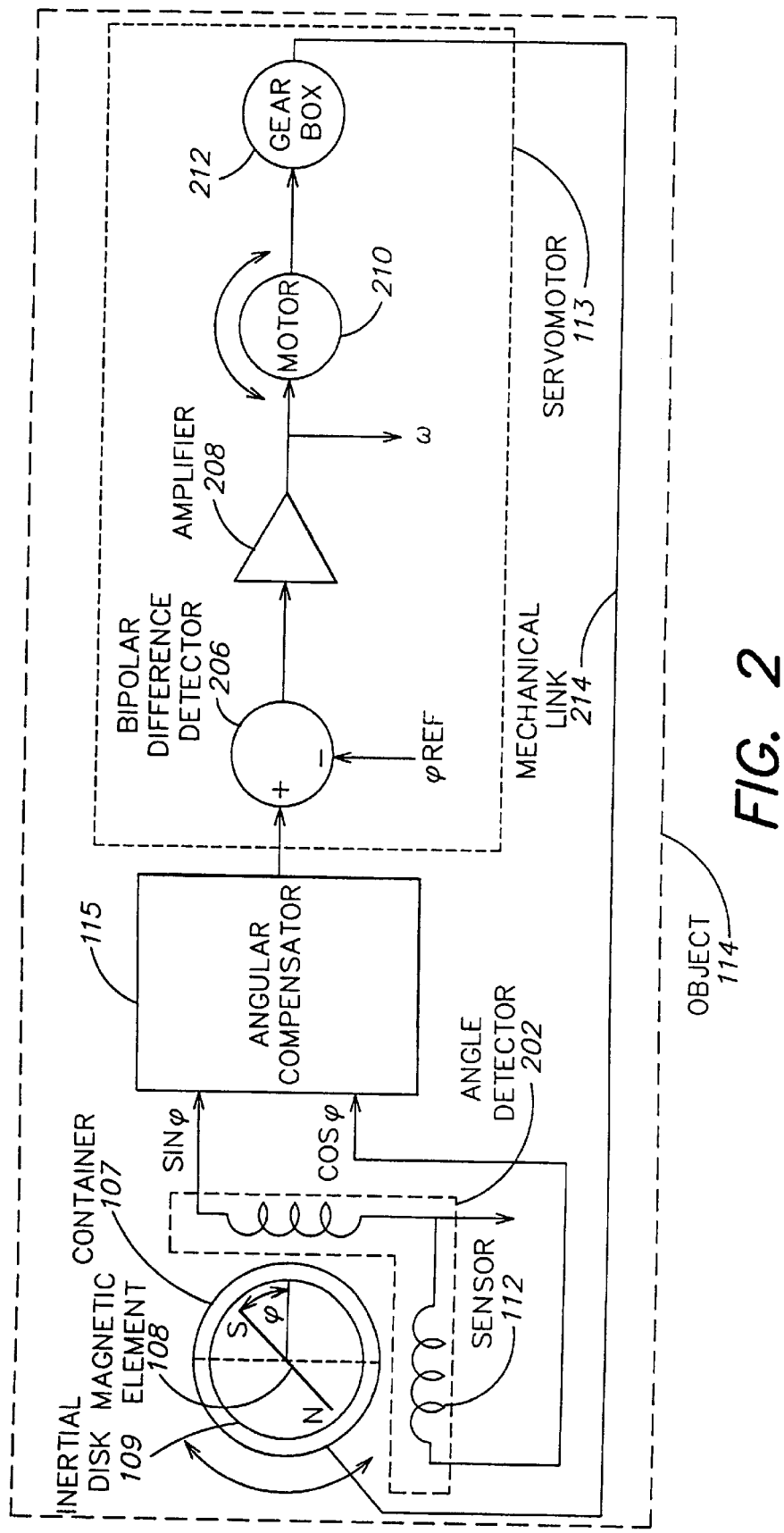
FIG. 2 is a block diagram of an apparatus for maintaining a turn sensor in a same angular position in accordance with one embodiment of the invention.

FIG. 2 is a block diagram of an exemplary apparatus for maintaining a turn sensor in the same angular position as an inertial disc 109. This apparatus may be used in conjunction with various turn sensor embodiments such as those shown in FIGS. 1A–1E. As the container 107 creates a displacement angle $\phi$ relative to magnetic element 108, angle detector 202 senses a change in magnetic flux produced by the magnetic element 108. Angle detector 202 includes a magnetic sensor 112 that provides signals to angular compensator 115. Sensor 112 includes a plurality of coils that generate a sin $\phi$ and cos $\phi$ to the angular compensator 115 that calculates a rotation angle $\phi$ and provides a control signal to servomotor 103. It should be understood that any method for determining a rotation angle may be implemented.

Servomotor 113 includes a bipolar difference detector that compares angle $\phi$ with an external reference angle $\phi_{REF}$. $\phi_{REF}$ is a reference angle that may correspond to an initial rotation angle of the magnetic element 108. This reference angle is typically determined when the sensor is turned on or calibrated during operation.

Bipolar difference detector 206 provides an error signal to amplifier 208. The amplifier 208 in turn provides a control signal to motor 210 that allows the motor to rotate in a clockwise or counter clockwise direction. Motor 210 is coupled to a gear box 212 which is then physically coupled to the container 107 through a mechanical link 214. The gear box may be geared such that precise control of the container rotation is maintained within a tolerance of hundredths of a degree of turn. Motor 210 is physically coupled to the object 114 and rotates the container 107 with respect to the platform 108.

The apparatus as shown in FIG. 2 and as described above is an example of an apparatus used for maintaining a turn sensor in a same angular position. It should be understood that other apparatuses may be used.

Figure 3A:
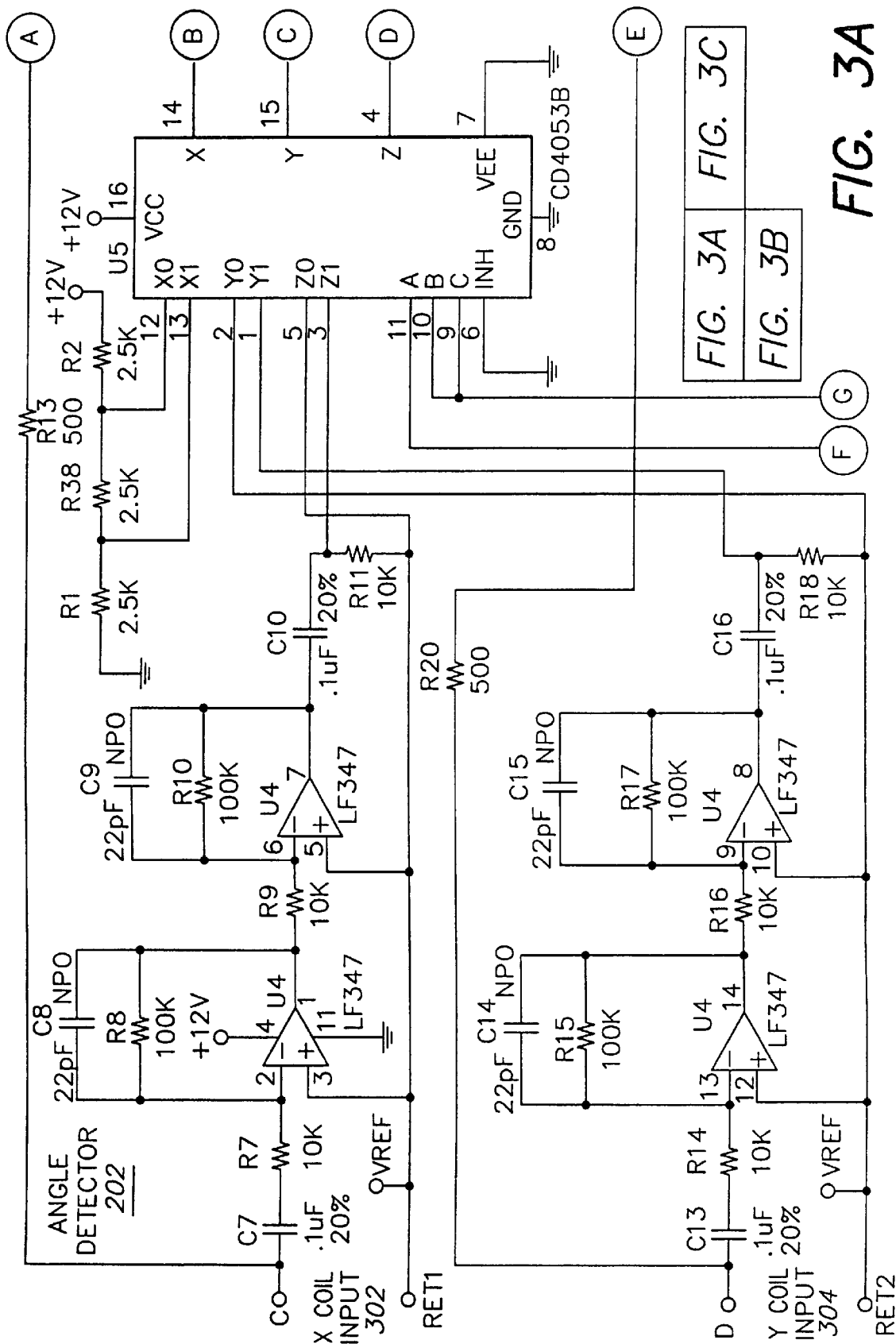
FIG. 3 is a circuit diagram of one embodiment of an angular detector in accordance with another embodiment of the invention.
Figure 3B:
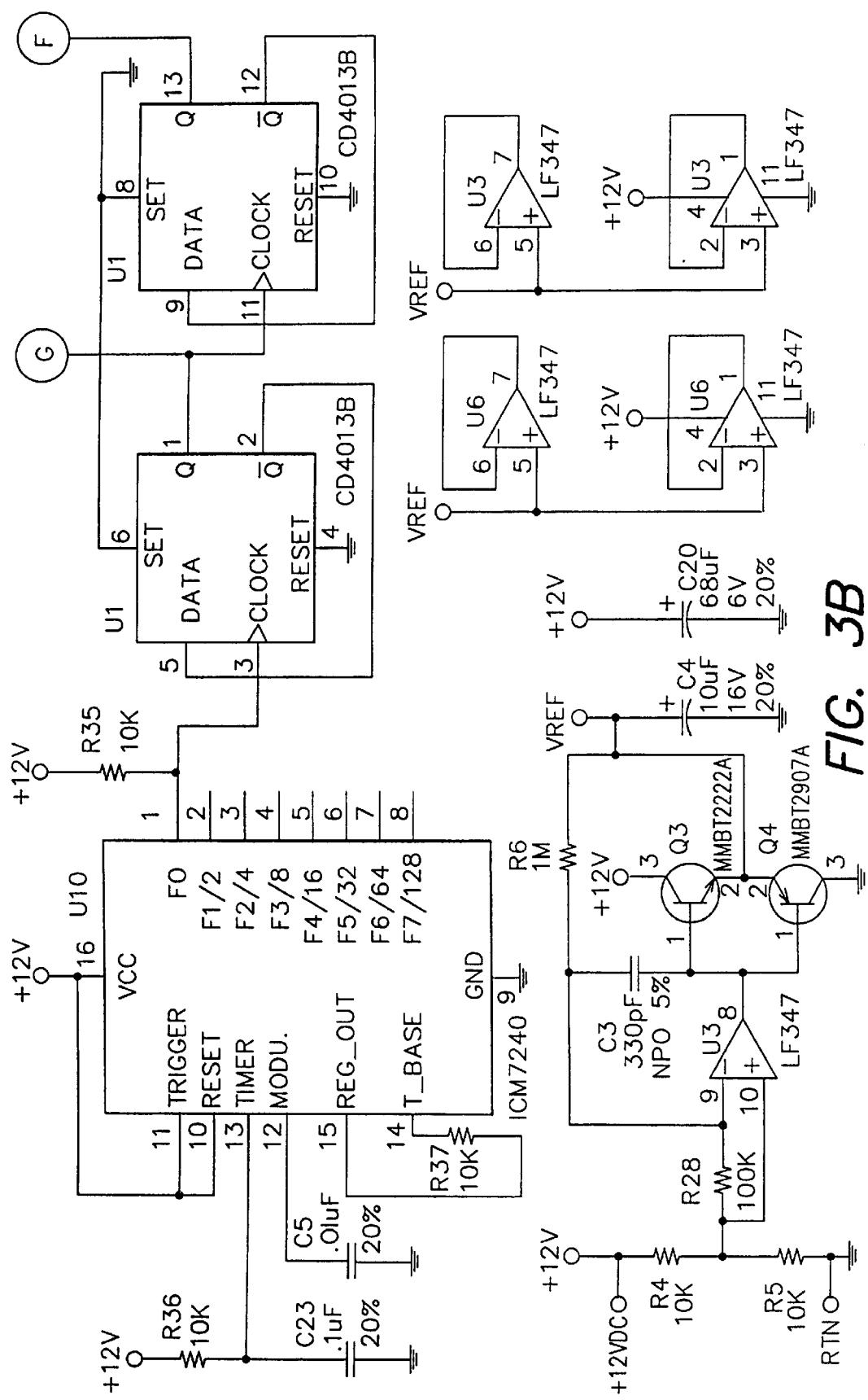
Figure 3C:
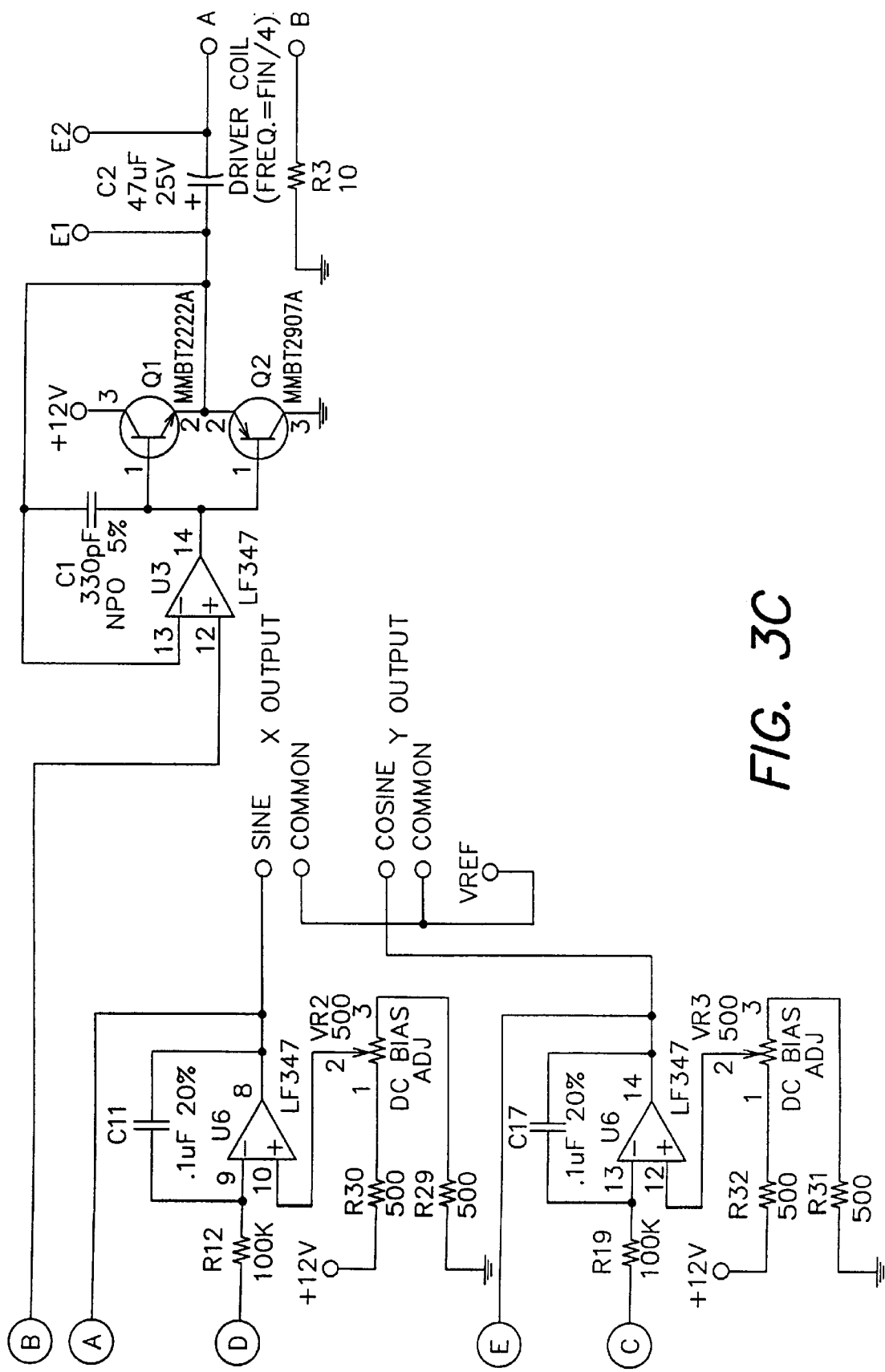

FIG. 3 shows one embodiment of an angle detector 202 of the present invention. Angle detector 202 accepts X-COIL input 302 and Y-COIL input 304 and conditions the signals by a series of amplifiers U4. The amplified signals are provided to a multiplexer U5 that selectively outputs the signals in accordance with a clocking signal provided by timer U10 and flip-flops U1. A voltage is provided by an external voltage source through the multiplexer U5 to the x and y coils of sensor 112. The coil voltages are applied to the coils, after which the x and y coils are sampled and output to angular compensator 115. After sampling the amplified X-INPUT and Y-INPUT 302, 304, the signals are again amplified before being output to the angular compensator 115.

The angle detector 202 is but one example of an apparatus used to detect a displacement angle. Other methods or apparatus for detecting angular displacement may be used.

Figure 4:
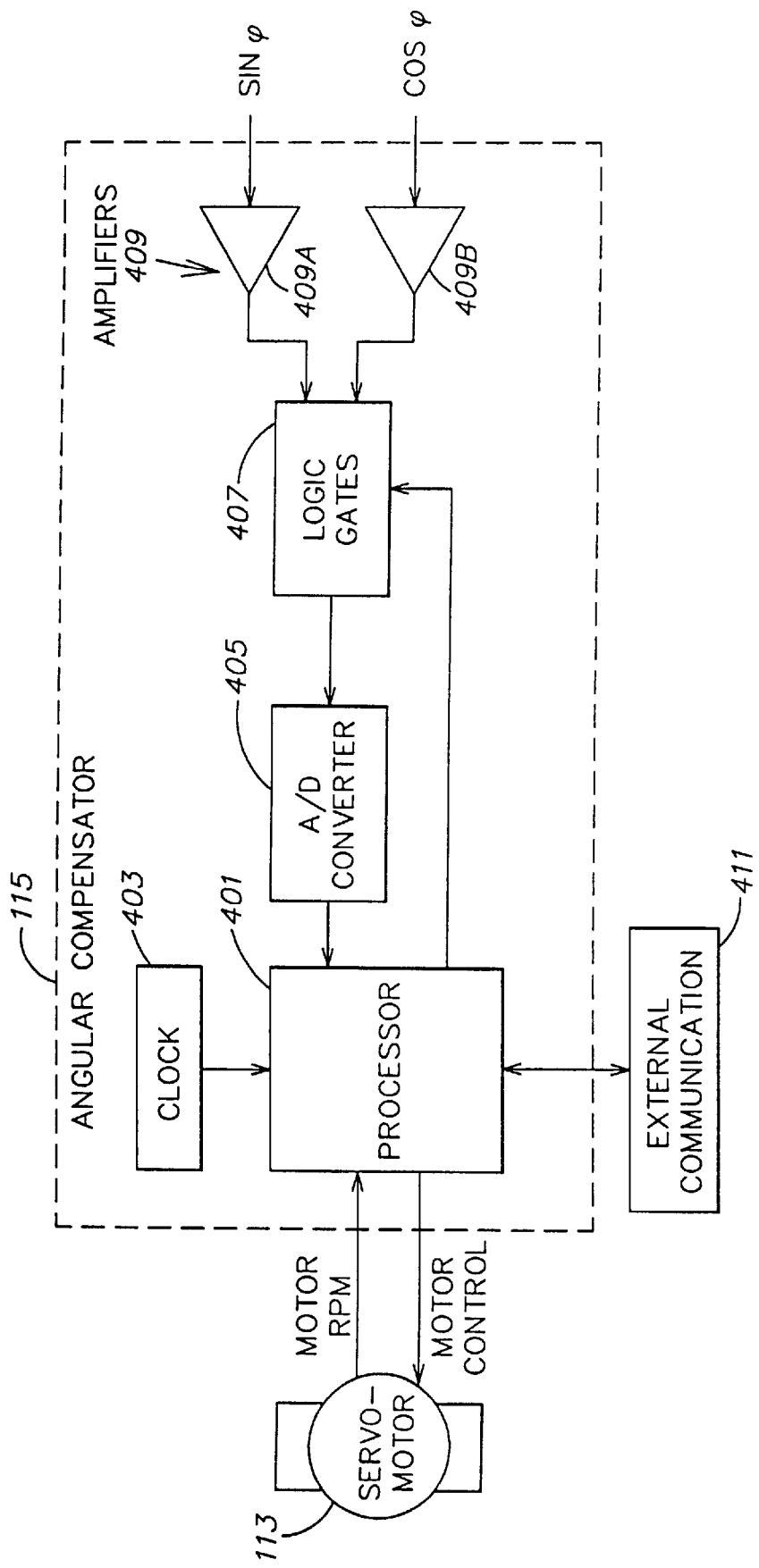
FIG. 4 is a block diagram of one embodiment of an angular compensator in accordance with another embodiment of the invention.

FIG. 4 shows a block diagram of one embodiment of an angular compensator 115 of the present invention. Angular compensator 115 includes a processor 401 that provides a motor control signal to servomotor 113. In turn, processor 401 may monitor the RPM of the servomotor to more effectively control it. Processor 401 accepts a clock signal from an external clock 403. Clock 403 may be used to provide clocking for various elements of angular compensator 115. According to one embodiment of the invention, angular compensator 115 includes amplifiers 409 which accept the sin $\phi$ and cos $\phi$ signals generated by angle detector 202. The amplified signals are provided to logic gates 407, that are controlled by the processor 401. Processor 401 may alternatively select the 409A or 409B amplifier outputs for input to A/D converter 405. Converter 405 converts the analog inputs to digital inputs that may be processed by processor 401. Processor 401 may then compute the angle $\phi$ and apply an appropriate motor control signal to the servomotor 113. Angular compensator 109 may also include an output to an external communication device 411 for monitoring the angle of rotation of the vehicle. External communication 411 may also provide a calibration control for the angular compensator 115.

The external communication device 411 may be, for example, an indicator for communicating the heading of the vehicle or a system that provides a control function for the vehicle. In one embodiment of the invention, the control system function is an autopilot function that uses the heading signal to maintain the heading of the vehicle. Other uses for the heading information are available.

It should be understood that the angular compensator of FIG. 4 and as described above is but one method for correcting a rotation angle of a turn sensor, and that other apparatuses and methods may be used.

Figure 5A:
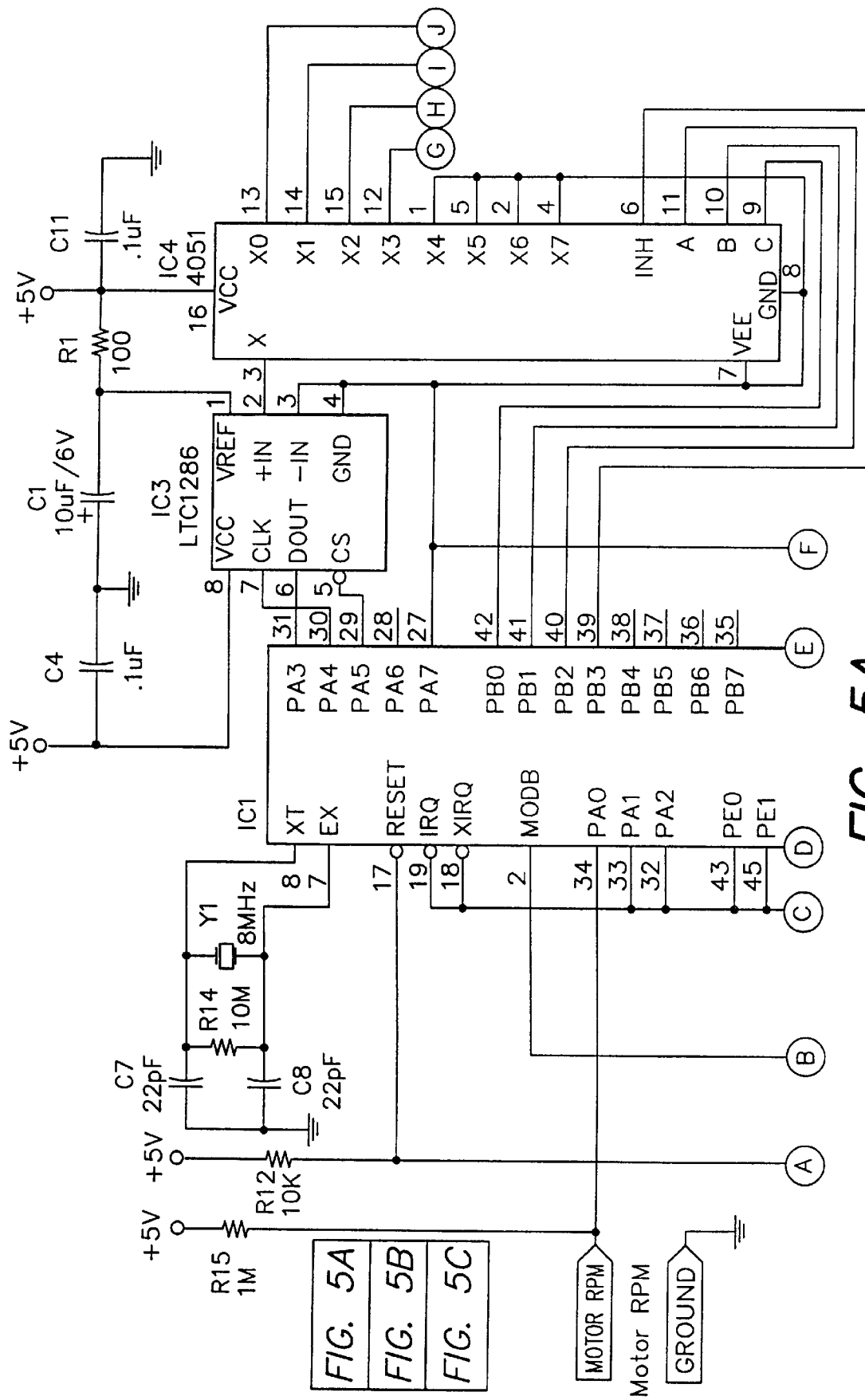
FIG. 5 is a circuit diagram of one embodiment of an angular compensator in accordance with another embodiment of the invention.
Figure 5B:
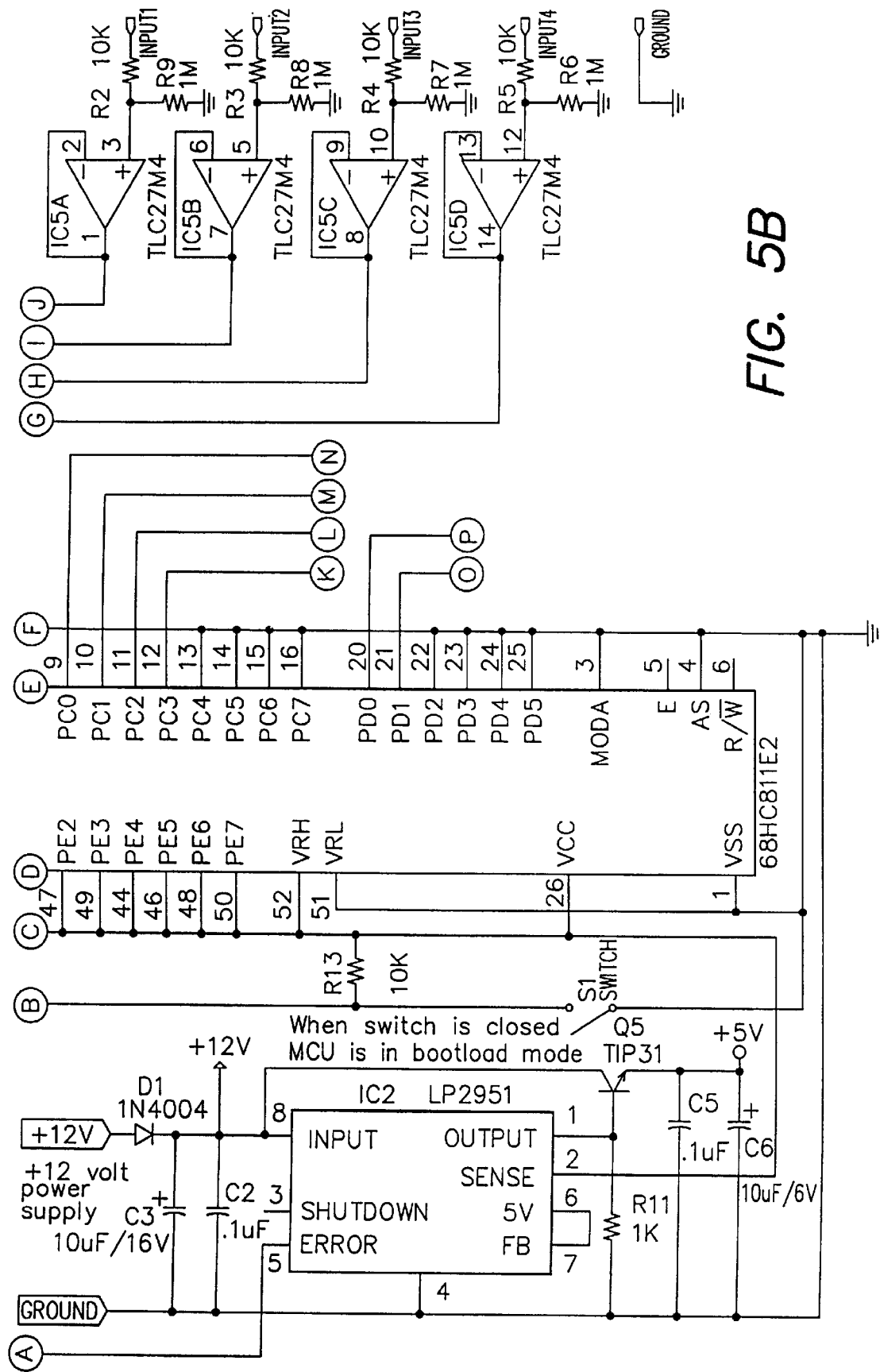
Figure 5C:
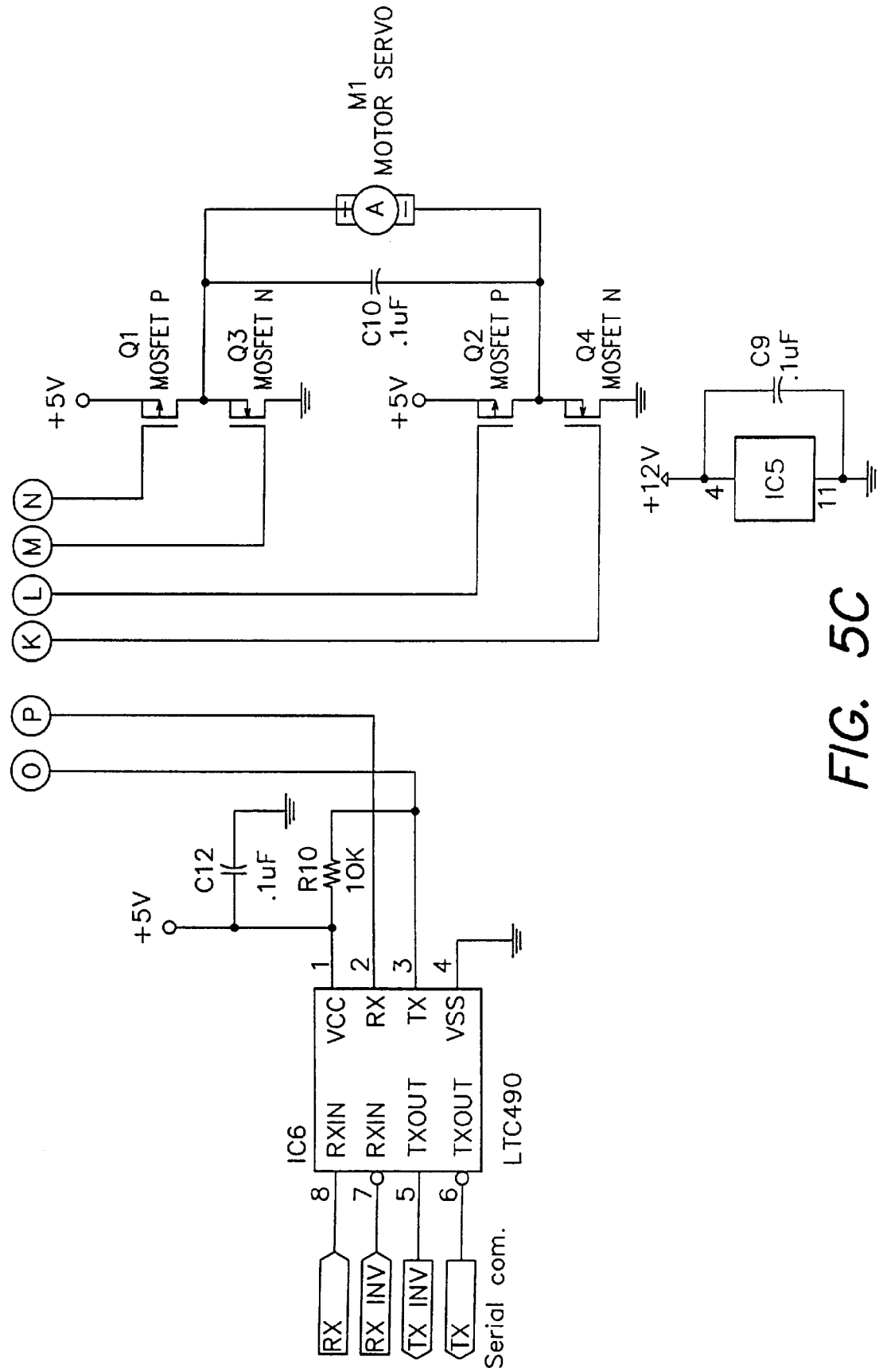

FIG. 5 shows a circuit diagram of the embodiment of the angle compensator 115 in accordance with one embodiment of the present invention. Angular compensator 115 may include a microprocessor IC1 which may be, for example, a Motorola 68XXX series microcontroller (Motorola is a registered trademark of the Motorola Corporation). Other processors may be used. Inputs signals 1–4 are provided from the COIL-X and COIL-Y outputs of angle detector 202. The signals are amplified and input into a digital logic chip IC4 that is controlled by processor IC 1. Processor IC1 may selectively measure either the COIL-X or COIL-Y input by controlling logic chip IC4. Logic chip IC4 provides an output signal to digital to analog converter IC3 which converts either the COIL-X input or COIL-Y input to a digital value for use by processor IC1. Processor IC1 provides a motor correction control signal to servomotor M1 based on the displacement angle $\phi$. The control signal is provided so that the angle $\phi$ will be minimized. Device IC2 accepts a 12 volt power supply and provides a regulated voltage for the angular compensator 109 components. The angular compensator 109 may also include a device IC6 which provides serial communications to processor ICI for providing sensor information to an external device or for providing corrective actions to processor IC1.

Angular compensator 115 is but one example of an apparatus used to provide motor correction signals based on a sensed displacement angle. Other methods or apparatus may be used.

For example, if a turn sensor is mounted aboard a boat which makes ten complete circles in a day, the servomotor 113 will rotate much less frequently than the motor of a convention gyroscopic sensor. With a gear ratio of 100:1, a servomotor of such a turn sensor would make 1000 revolutions per day. In contrast, a conventional gyroscopic sensor may make several million revolutions in one day.

Because a mean time before failure (MTBF) for a motor typically depends upon the number of hours the motor rotates at design speed, various embodiments of the present invention may have a MTBF greater than that of conventional gyroscopic sensors. More specifically, the MTBF may be a thousand times that of a conventional sensor due to the decrease in motor design speed. For example, MTBF for one embodiment may be 27 years if the motor has a life expectancy of 1 million rotations and experiences 100 rotations per day. A conventional gyroscopic sensor may have an MTBF of only several thousand hours.

Figure 6:
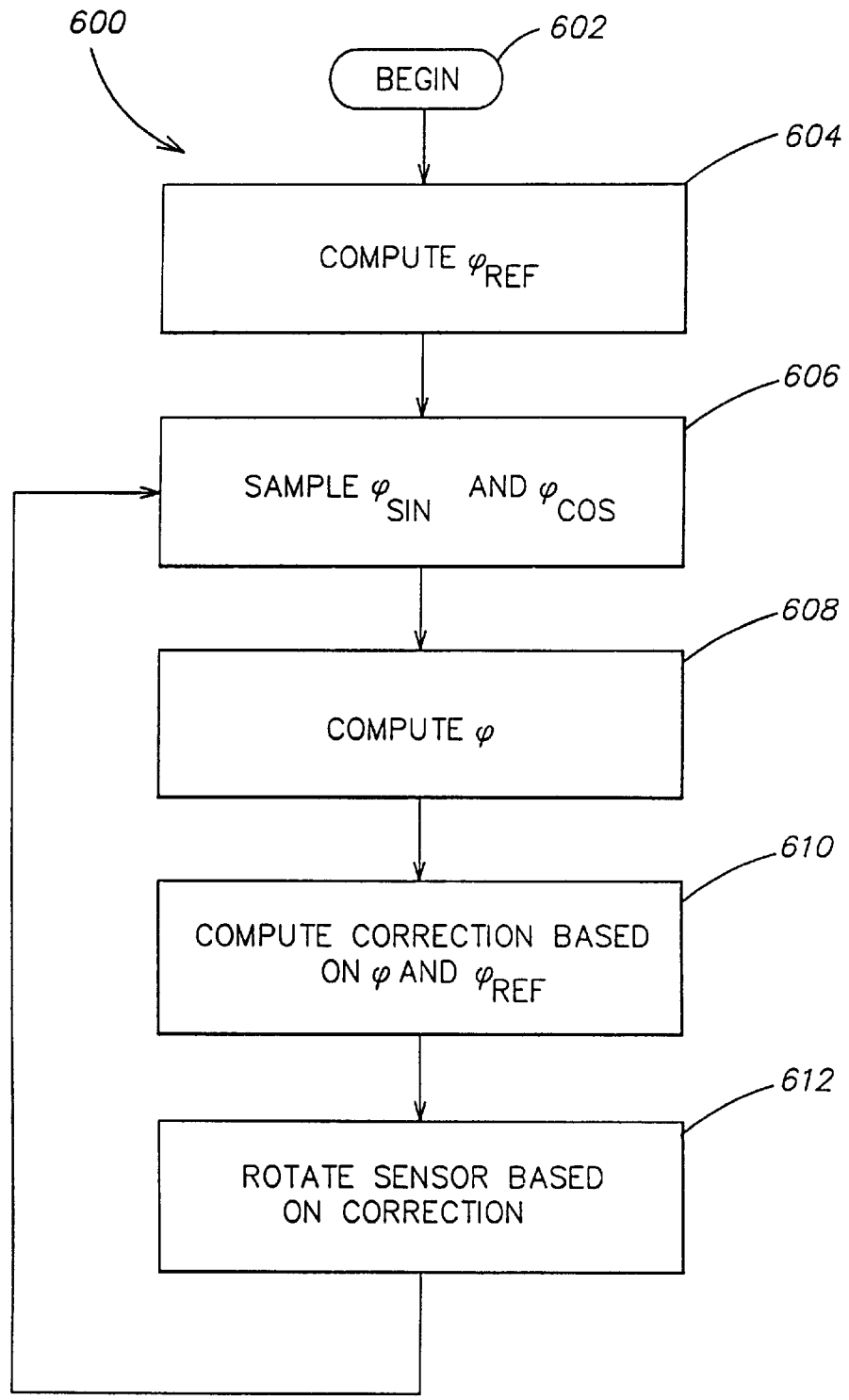
FIG. 6 is a flowchart illustrating an exemplary angle correction process of the present invention.

FIG. 6 is directed to an exemplary process 600 for correcting the angular position of the turn sensor. At step 602, sensor 150 begins the correction process 600. At step 604, sensor 150 computes $\phi_{REF}$. At step 606, sensor 150 samples $\phi_{SIN}$ and $\phi_{COS}$ produced by angle detector 202. Sensor 150 computes $\phi$ at step 608 and computes a correction based on $\phi$ and $\phi_{REF}$ at step 610. Sensor 150 is then rotated at step 612 based on the computed correction to align with the reference object, which maintains its angular orientation. If the platform rotates clockwise, sensor 150 is driven clockwise by the same amount, and vice versa. Sensor 150 remains constantly aligned with the reference object. The measurement is a direct measurement of angular displacement, and thus, no calibration is required. The rate of turn is d$\phi$/dt and is accurate to the degree of accuracy that $\phi$ and t can be measured. In contrast, a gyroscopic sensor measures rate of turn and requires calibration. Turn is then determined by integration which incurs drift problems. Also, integration magnifies errors in the rate of turn.

Although this invention generally describes a turn sensor implementing a magnetic element and their associated sensor elements, it should be understood that this apparatus could be easily adapted for use with any method for measuring turn of a fixed object, such as using optics or optical electronic methods.

While various embodiments of the present invention have been described above, it should be understood that they have been presented by way of example only, and not limitation. Thus, the breadth and the scope of the present invention are not limited by any of the above-described exemplary embodiments, but are defined only in accordance with the following claims and their equivalents.

What is claimed is:

1. A method for measuring angular motion of an object comprising steps of:

providing a reference object for the object so that the reference object maintains an independent angular position despite rotational motion of the object and forces external to the reference object; and measuring the rotational motion of the object by measuring an angular displacement of the object with respect to the independent angular position of the reference object.

2. The method according to claim 2, further comprising steps of:

controlling a reference device to rotate in relation to the object so that the reference device maintains an angular relation to the reference object; and measuring the rotational motion of the object based upon an amount that the reference device is controlled in the step of controlling.

3. The method according to claim 1, wherein the measuring step includes a step of:

measuring a magnetic flux produced by a magnetic element coupled to a rotating element.

4. The method according to claim 1, wherein the measuring step includes a step of:

measuring a magnetic flux produced by a magnetic element coupled to a rotating disc that is suspended.

5. The method according to claim 3, wherein the rotating element is a rotating disc.

6. An apparatus for measuring angular motion of an object, comprising:

a reference object that independently maintains an angular position despite rotational motion of the object;

a reference device coupled to the object, the reference device including an angular compensator having an output providing a control signal that controls rotation of the reference device with respect to the object so that the reference device maintains an angular relationship with the reference object; and a position unit having an input that receives the control signal and an output that provides an indication of the rotational motion of the object based upon the control signal.

7. The apparatus according to claim 6, wherein the reference object comprises:

a container having fluid;

a rotating object that is allowed to rotate freely within the container and is positioned within the container; and a sensing element configured to sense an angular displacement of the rotating object.

8. The apparatus according to claim 7, wherein a magnetic element is coupled to the rotating object and the sensing element is a sensor configured to sense a change in magnetic flux produced by the magnetic element.

9. The apparatus according to claim 7, wherein the rotating object has weight and that weight is substantially suspended by the fluid.

10. The apparatus according to claim 9, wherein the container is substantially surrounded by a magnetic shielding material.

11. The apparatus according to claim 7, wherein the rotating object is a disc.

12. The apparatus according to claim 11, wherein the apparatus provides a signal to the angular compensator to determine a displacement angle of the reference object with respect to the rotating object.

13. The apparatus according to claim 12, wherein the output of the angular compensator provides a control signal that controls rotation of the object to align a reference object container with the rotating object within the container.

14. The apparatus according to claim 6, wherein the reference object is coupled to the object.

15. A method for measuring angular motion of an object, comprising the steps of:

arranging a reference object so that the reference object is coupled to the object but maintains an independent angular reference despite the angular motion of the object;

controlling a reference device to move in relation to the reference object so that the reference device substantially maintains an angular relationship with the reference object; and measuring the motion of a platform based upon an amount that the reference device is controlled in the step of controlling.

16. A system for measuring a displacement angle of an object, the system including an apparatus comprising:

a container having fluid;

a rotating object having weight, the rotating object being allowed to rotate freely within the container and is positioned within the container, wherein the weight of the rotating object is substantially suspended by the fluid; and a sensing element configured to sense an angular displacement of the rotating object.

17. The apparatus according to claim 16, wherein a magnetic element is coupled to the rotating object and the sensing element is a sensor configured to sense a change in magnetic flux produced by the magnetic element.

18. The apparatus according to claim 16, wherein the container is substantially surrounded by a magnetic shielding material.

19. The apparatus according to claim 16, wherein the rotating object is a disc.

20. The apparatus according to claim 16, wherein the sensor provides a signal to an angular compensator to determine a displacement angle of the object with respect to the rotating object.

21. The apparatus according to claim 20, wherein an output of the angular compensator provides a control signal that controls rotation of the object to align the container with the rotating object within the container.

\* \* \* \* \*

UNITED STATES PATENT AND TRADEMARK OFFICE
CERTIFICATE OF CORRECTION

PATENT NO.    : 6,058,760
DATED         : May 9, 2000
INVENTOR(S)   : Kits van Heyningen It is certified that error appears in the above-identified patent and that said Letters Patent is hereby corrected as shown below:

Title page,
Item [12], replace "Van Heyningen" with -- Kits van Heyningen --.
Item [75], replace "Inventor: Arent Kits Van Heyningen" with -- Arent Kits van Heyningen --.

Signed and Sealed this

Third Day of September, 2002

Attest:

Attesting Officer

JAMES E. ROGAN
Director of the United States Patent and Trademark Office